J. M. GLEICHMAN.
ANIMAL-TRAP.
No. 191,234. Patented May 29, 1877.
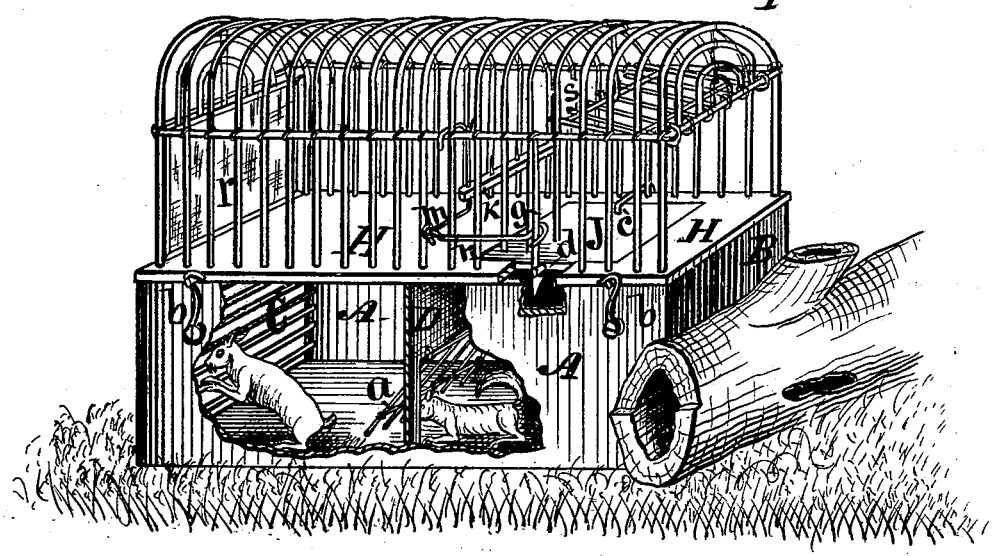
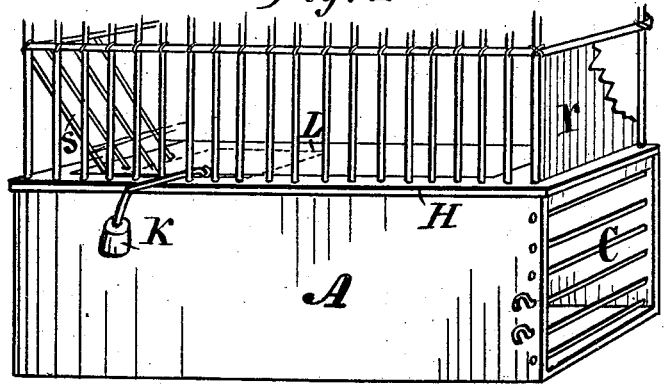

UNITED STATES PATENT OFFICE.

JOHN M. GLEICHMAN, OF STUART, IOWA, ASSIGNOR OF ONE-HALF HIS RIGHT TO RILEY CONNER, OF SAME PLACE.

IMPROVEMENT IN ANIMAL-TRAPS.

Specification forming part of Letters Patent No. 191,234, dated May 29, 1877; application filed March 24, 1877.

*To all whom it may concern:*

Be it known that I, JOHN M. GLEICHMAN, of Stuart, in the county of Guthrie and State of Iowa, have invented an Improved Animal-Trap, of which the following is a specification:

The object of my invention is to construct a trap that can be separated and adjusted to be used alternately, as occasions and places may require, as a falling-platform trap or a sliding-gate trap.

It consists in arranging and combining a closed pit having a dividing and sliding skeleton or open gate in its center, and one end closed with bars, that restrain animals, but admit light and air, with a cage having a falling door in its bottom and a sliding gate in one end and a looking-glass in the opposite end, all as hereinafter fully set forth.

Figure 1 of my drawing is a perspective view, illustrating the construction and operation of my invention.

A A are the sides of an oblong box or pit, fixed to a bottom of corresponding size in any suitable way.

B is a fixed piece closing one end of the pit.

C represents the opposite end closed with rods or bars that are attached to the sides A in any suitable way.

D is a partition fixed in a central and transverse position to divide the box into two compartments.

$a$ is a sliding gate, composed of wires or bars, hinged in an opening of corresponding size formed in the partition D.

H is the bottom of a movable wire or open-work cage, I, corresponding in size with the box A B, and secured thereto to cover its open top, by means of hooks or suitable catches $b\ b$, in such a manner that it can be detached and removed at pleasure.

J is a trap-door or falling platform fitted in a corresponding opening near the end of the cage-bottom and pit-cover H. It is pivoted in such a manner that the weight of an animal will cause it to tilt downward to precipitate the animal into the pit below.

$c$ is a bent lever rigidly secured to the door J in such a manner that a weight on its end will balance the weight of the door and hold it in a closed normal position.

$d$ is a pin projecting from the front edge of the door J.

$g$ is a spring-latch fixed to the cage. It engages the pin $d$ and locks the door in its closed normal position.

$k$ is a bar and bait hook suspended in the cage over the inner end of the door J.

$m$ is a rod rigidly connected with the suspended bar K, and extending outside of the cage.

$n$ is a connecting-rod linked to the rod $m$, and bent around the latch $g$ at its free end.

$r$ is a looking-glass fixed in the closed end of the cage.

$s$ is a gate hinged in the open end of the cage, and held up and open by means of a hook depending from the top of the cage.

When an animal has entered the open end of the cage, decoyed by the glass $r$ and bait, and is upon the door J, it seizes the bait on the bar K, and by so doing operates the latch $g$ to release the door, and falls with the door into the pit below. The weight connected with the door instantly closes the door again when the animal is off. The light coming through the end C of the divided pit will cause the animal to pass through the gate $a$ of the partition D, and leave the dark chamber of the pit ready for the reception of another victim.

Fig. 2 is a perspective view, showing the reverse side of Fig. 1, and illustrates my manner of using the cage and making the trap-door inoperative, as required when the cage is detached from the pit A B.

K is the weight, carried by the bent rod $c$, extending from the trap-door J.

L is an auxiliary movable bottom placed in the cage to cover the falling door J and make it inoperative. When thus arranged the gate S in the open end of the cage is dropped from its suspending-hook to allow its free end to rest on the bottom L, so that animals decoyed by the bait and the glass will pass inward by lifting it, but cannot lift it to pass out again.

By detaching the cage from the box A B it can be placed over a barrel or any other receptacle, and used advantageously and independently of the box in positions where the box is not admissible.

My traps can be made of any size desired, and adapted for large or small animals.

I claim as my invention—

The box A B, having the open end C, and partition D and its gate a, the cage I having the fixed bottom H, the falling platform J and its operating mechanism c d g k m n, the hinged door s, and the looking-glass r, all arranged and combined to operate substantially as and for the purposes shown and described.

JOHN M. GLEICHMAN.

Witnesses:
FR. REINECKE,
D. B. SPENCER.